(12) United States Patent
Kanda et al.

(10) Patent No.: US 11,977,709 B2
(45) Date of Patent: May 7, 2024

(54) INPUT DEVICE

(71) Applicant: Panasonic Intellectual Property Management Co., Ltd., Osaka (JP)

(72) Inventors: Shinji Kanda, Fukui (JP); Yoshihiro Hosokawa, Fukui (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/163,054

(22) Filed: Feb. 1, 2023

(65) Prior Publication Data
US 2023/0350529 A1  Nov. 2, 2023

(30) Foreign Application Priority Data

Mar. 29, 2022  (JP) ................................ 2022-053103

(51) Int. Cl.
*G06F 3/044* (2006.01)
(52) U.S. Cl.
CPC .................. *G06F 3/0448* (2019.05)
(58) Field of Classification Search
CPC .................................................. G06F 3/0448
USPC .............. 345/173, 174; 178/18.06
See application file for complete search history.

(56) References Cited

U.S. PATENT DOCUMENTS

| | | | | |
|---|---|---|---|---|
| 2009/0256817 A1* | 10/2009 | Perlin | ................... | G06F 3/0233 |
| | | | | 178/18.05 |
| 2013/0181943 A1* | 7/2013 | Bulea | ..................... | G06F 3/041 |
| | | | | 345/174 |
| 2014/0049505 A1* | 2/2014 | Radivojevic | ............ | G08B 6/00 |
| | | | | 345/173 |
| 2015/0227229 A1* | 8/2015 | Schwartz | .............. | G06F 3/0446 |
| | | | | 345/174 |
| 2016/0202826 A1* | 7/2016 | Han | ....................... | G06F 3/0412 |
| | | | | 345/174 |
| 2017/0357361 A1* | 12/2017 | Hong | .................. | G06F 3/04886 |
| 2021/0088361 A1* | 3/2021 | Betiuk | ................. | H03K 17/975 |

FOREIGN PATENT DOCUMENTS

JP    2017224266 A    12/2017

* cited by examiner

*Primary Examiner* — Prabodh M Dharia
(74) *Attorney, Agent, or Firm* — Seed IP Law Group LLP

(57) ABSTRACT

An input device includes: a plurality of first sensor electrodes; and a plurality of second sensor electrodes. Furthermore, the plurality of first sensor electrodes and the plurality of second sensor electrodes are electrically disconnected. Additionally, the plurality of first sensor electrodes are disposed in a radial arrangement centered on a reference point. Moreover, the plurality of second sensor electrodes are disposed in a concentric circular arrangement centered on the reference point.

12 Claims, 6 Drawing Sheets

Reference point

INPUT DEVICE

CROSS REFERENCE TO RELATED APPLICATION

The present application is based on and claims priority of Japanese Patent Application No. 2022-053103 filed on Mar. 29, 2022.

FIELD

The present disclosure relates to an input device.

BACKGROUND

Patent literature (PTL) 1 discloses a touch sensor that includes a substrate, a first sensor that is provided on the substrate and detects the location and pressure of touch inputs, and a plurality of capacitive second sensors that are provided on the substrate, the first sensor being disposed in a central area of one surface of the substrate, the plurality of second sensors being disposed so as to surround the first sensor.

CITATION LIST

Patent Literature

PTL 1: Japanese Unexamined Patent Application Publication No. 2017-224266

SUMMARY

The touch sensor according to above-described patent literature (PTL) 1 can be improved upon.

In view of this, the input device according to the present disclosure is capable of improving upon the above related art.

An input device according to an aspect of the present disclosure is an input device that is capacitive and includes: a plurality of first sensor electrodes; and a plurality of second sensor electrodes, wherein the plurality of first sensor electrodes and the plurality of second sensor electrodes are electrically disconnected, the plurality of first sensor electrodes are disposed in a radial arrangement centered on a reference point, and the plurality of second sensor electrodes are disposed in a concentric circular arrangement centered on the reference point.

Note that the general and specific aspects of the present disclosure may be implemented using a system, a device, a method, a recording medium, or a computer program, or any combination of systems, devices, methods, recording media, or computer programs.

The input device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Hereinafter, embodiments will be described in detail with reference to the drawings.

It should be noted that the embodiments described below merely illustrate general or specific examples of the present disclosure. The numerical values, shapes, materials, elements, the arrangement and connection of the elements, steps, the order of the steps, etc., described in the following embodiments are mere examples, and are therefore not intended to limit the present disclosure. Accordingly, among elements in the following embodiments, those not appearing in any of the independent claims will be described as optional elements.

It should be noted that the figures are schematic diagrams and are not necessarily precise illustrations. In the figures, substantially same elements are given the same reference numbers.

In the following embodiments, expressions such as "approximately orthogonal" or "board-shaped" are used. For example, "approximately orthogonal" or "board-shaped" not only mean exactly orthogonal or exactly board-shaped, but also includes substantially orthogonal or substantially board-shaped, i.e., including an error of approximately several percent. In addition, "approximately orthogonal" and "board-shaped" mean orthogonal and board-shaped to an extent that the advantageous effects of the present disclosure can be achieved. The same applies to other expressions using "approximately" and "shaped".

Embodiment

<Configuration>

First, the configuration of input device 1 will be described with reference to FIG. 1 through FIG. 3A.

Figure 1:
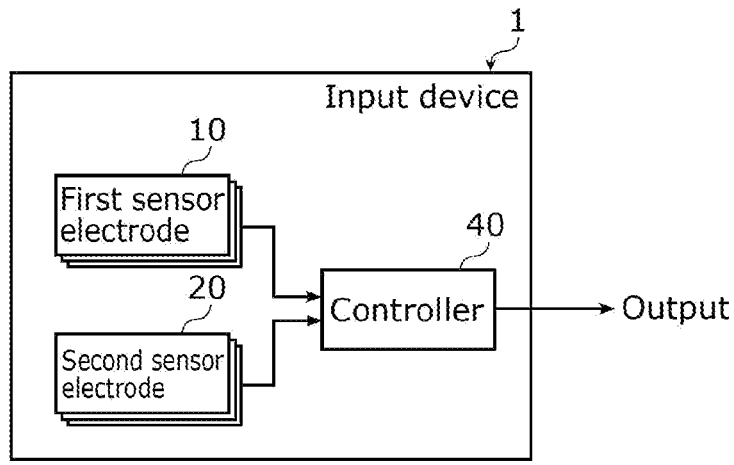
FIG. 1 is a block diagram illustrating an input device according to an embodiment.
Figure 2:
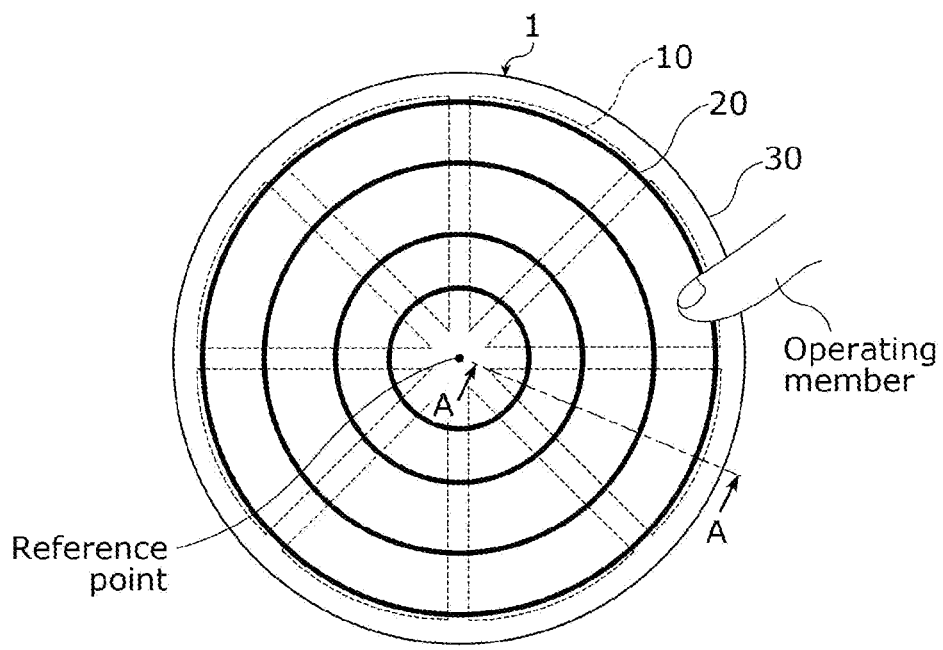
FIG. 2 is a plan view of the input device according to the embodiment.
Figure 3A:
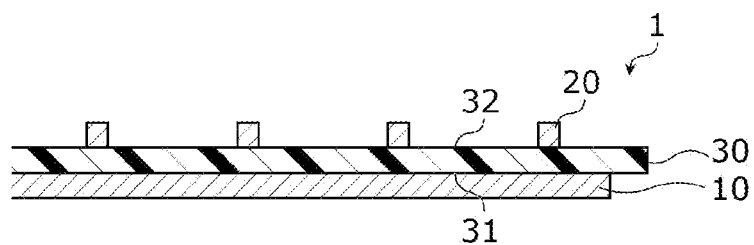
FIG. 3A is a cross-sectional view of the input device taken along line A-A in FIG. 2.
Figure 3B:
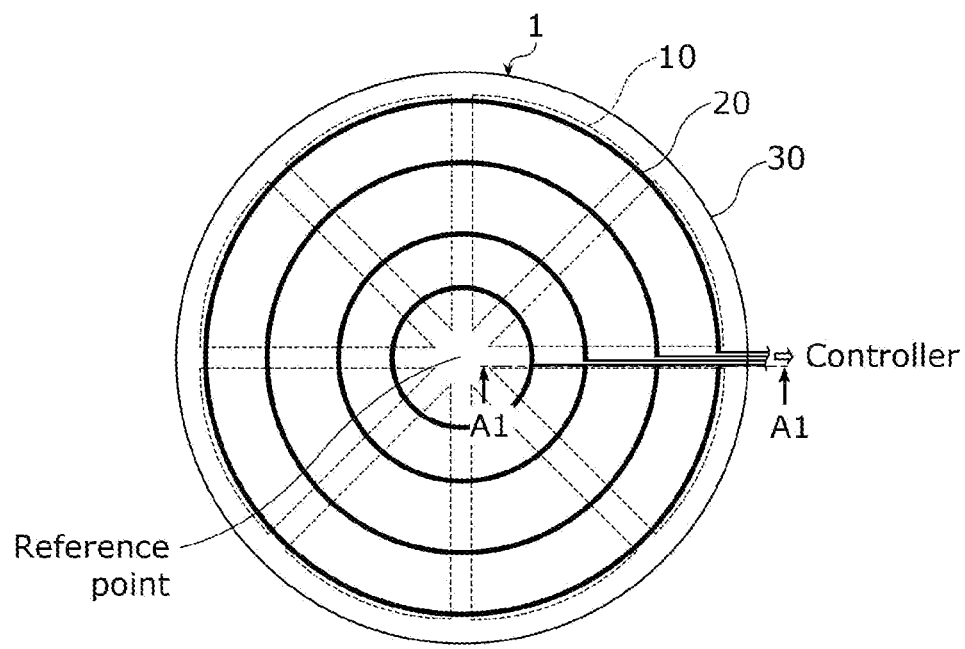
FIG. 3B is a plan view of another input device according to the embodiment.
Figure 3C:
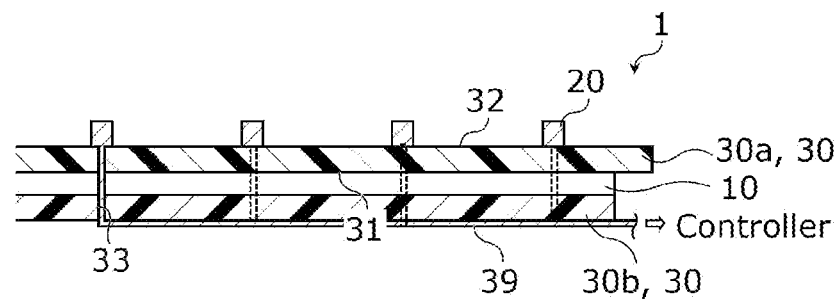
FIG. 3C is a cross-sectional view of the other input device taken along line A1-A1 in FIG. 3B.

FIG. 1 is a block diagram illustrating input device 1 according to an embodiment. FIG. 2 is a plan view of input device 1 according to the embodiment. FIG. 3A is a cross-sectional view of input device 1 taken along line A-A in FIG. 2. FIG. 3B is a plan view of another input device 1 according to the embodiment. FIG. 3C is a cross-sectional view of the other input device 1 taken along line A1-A1 in FIG. 3B.

As illustrated in FIG. 1, input device 1 is a capacitive touch sensor. Input device 1 is used as an operating device in devices in mobile bodies, such as vehicles and aircraft, and facilities, and the like. Input device 1 according to the present embodiment is used as a steering switch that is provided on a steering wheel of a vehicle. Furthermore, input device 1 may be used as an operating device that is provided on a center cluster of a vehicle.

As illustrated in FIG. 1 through FIG. 3A, input device 1 includes insulator 30, a plurality of first sensor electrodes 10, a plurality of second sensor electrodes 20, and controller 40.

Insulator 30 is a board-shaped substrate. The plurality of first sensor electrodes 10 and the plurality of second sensor electrodes 20 may be disposed on insulator 30. Specifically, insulator 30 includes one surface 31 and other surface 32 which is located on the reverse side of one surface 31. Each of the plurality of first sensor electrodes 10 is disposed on one surface 31 of insulator 30. Each of the plurality of second sensor electrodes 20 is disposed on other surface 32 of insulator 30.

In the present embodiment, insulator 30 is a disc-shaped substrate or disc-shaped electrostatic sheet, such as a PET (polyethylene terephthalate) film. It should be noted that the shape of insulator 30 is not limited to a circular shape in plan view. For example, insulator 30 may be polygonal in shape, or may by in a shape that combines a circular shape and a polygonal shape.

Each of the plurality of first sensor electrodes 10 is a planar electrode disposed on one surface 31 of insulator 30, spaced apart from each other so as to have no electrical connection between them. Each of the plurality of first sensor electrodes 10 is fan shaped, and in a plan view, the entirety of the plurality of first sensor electrodes are configured in a circular shape. Specifically, the plurality of first sensor electrodes 10 are disposed to extend in a radial arrangement centered on a reference point, and each of the plurality of first sensor electrodes 10 is formed to have a width that increases with distance from the reference point.

In the present embodiment, although eight first sensor electrodes 10 are disposed on one surface 31 of insulator 30, seven or less first sensor electrodes 10 may be disposed on one surface 31 of insulator 30, or nine or more first sensor electrodes 10 may be disposed on one surface 31 of insulator 30.

Each of the plurality of second sensor electrodes 20 is a wire-shaped electrode disposed on other surface 32, spaced apart from each other so as to have no electrical connection between them. Each of the plurality of second sensor electrodes 20 is circular in shape, and in plan view, the plurality of second sensor electrodes 20 are disposed in a concentric circular arrangement centered on the reference point.

In the present embodiment, although four second sensor electrodes 20 are disposed on other surface 32 of insulator 30, three or less second sensor electrodes 20 may be disposed on other surface 32 of insulator 30, or five or more second sensor electrodes 20 may be disposed on other surface 32 of insulator 30.

To prevent electrical connection between the plurality of first sensor electrodes 10 and the plurality of second sensor electrodes 20, first sensor electrodes 10 are disposed on one surface 31 of insulator while second sensor electrodes 20 are disposed on other surface 32 of insulator 30. Specifically, other surface 32 is located closer to an operation surface than one surface 31. Other surface 32 may be located closer to an operating member than one surface 31. In this way, by disposing second sensor electrodes 20, which are wire-shaped electrodes, on other surface 32, and disposing first sensor electrodes 10, which are planar electrodes, on one surface 31, input device 1 can accurately detect the approach of the operating member. The "operation surface" is, for example, a virtual surface on input device 1, which is operated by an operating member, or in the case where an operation panel is disposed to cover other surface 32, the "operation surface" is the surface of the operation panel.

Furthermore, as illustrated in FIG. 3B, a portion of each of the plurality of second sensor electrodes 20 may have a notch. An end of each of the plurality of notched second sensor electrodes 20 may be electrically connected to controller 40. The locations of the notched portions of the plurality of second sensor electrodes 20 may correspond to a gap between two first sensor electrodes 10 that are disposed adjacent to each other in a circumferential direction. That is to say, when device 1 is seen in plan view, the locations of the notched portions of the plurality of second sensor electrodes 20 may overlap with the gap between two adjacent first sensor electrodes 10. For this reason, by providing a notch at the portion of each of the plurality of second sensor electrodes 20 corresponding to the gap, wiring may be arranged to individually electrically connect the plurality of second sensor electrodes 20 and controller 40.

Furthermore, as illustrated in FIG. 3C, the plurality of second sensor electrodes 20 may be electrically connected to controller 40 by separately providing wiring layer 39 on input device 1. In this case, a two-layer structure having an overlapping first layer and second layer may be used in insulator 30, and each of the plurality of second sensor electrodes 20 may be electrically connected to controller 40 by disposing wiring layer 39 between the first layer and second layer and electrically connecting wiring layer 39 to the plurality of second sensor electrodes 20. Furthermore, as illustrated in FIG. 3C, the plurality of second sensor electrodes 20 may be electrically connected to controller 40 by separately providing wiring layer 39 at a level lower than the plurality of first sensor electrodes 10. In this case, insulation layer 30b may be provided below the plurality of first sensor electrodes 10, and wiring layer 39 may further be provided below insulation layer 30b. In either case, in the plurality of second sensor electrodes 20, by forming through-holes 33 at locations on insulators 30a and 30b that correspond to the gap between two first sensor electrodes 10 that are adjacent to each other in the circumferential direction, the plurality of second sensor electrodes 20 can be electrically connected to wiring layer 39.

Controller 40 identifies the input location of the operating member based on changes in capacitance of each of the plurality of first sensor electrodes 10 and each of the plurality of second sensor electrodes 20. Specifically, when the operating member approaches or touches input device 1, changes in capacitance will occur between first sensor electrodes 10 and the operating member, and between second sensor electrodes 20 and the operating member. Controller 40 identifies the input location of the operating member by using polar coordinates, based on changes in capacitance of first sensor electrodes 10 and second sensor electrodes 20. Specifically, controller 40 identifies the input location using polar coordinates by obtaining a distance from the reference point (radius) r based on changes in capacitance of the plurality of second sensor electrodes 20, and obtaining an angle θ based on changes in capacitance of the plurality of first sensor electrodes 10. By obtaining the distance from the reference point (radius) r, and using the plurality of second sensor electrodes 20, operation can be detected even when an operation such as non-contact tracing with the operating member moving in close proximity is performed.

As a result of identification, controller 40 outputs the location coordinates of the operating member in relation to input device 1 and changes in location caused by gestures. The location coordinates are plane coordinates or polar coordinates. For plane coordinates, when an x-axis and y-axis are established where 0 is the reference point, the point of intersection between first sensor electrode 10 among the plurality of first sensor electrodes 10 and second sensor electrode 20 among the plurality of second sensor electrodes 20 is represented as an x, y coordinate. For polar coordinates, when an x-axis and y-axis are established where 0 is the reference point, polar coordinates are represented by angle θ of first sensor electrode 10 detected in relation to the x-axis, and the detected distance (radius) r from the reference point to second sensor electrode 20. The amount of change in location caused by gestures corresponds to changes in coordinates caused by sliding operations, or the like. The operating member is a human finger, a stylus pen, or the like. Controller 40 is composed of a dedicated control circuit or a general-purpose processor, or the like.

<Functions and Effects>

Next, the functions and effects of input device 1 according to the present embodiment will be described.

Since first sensors in a conventional touch sensor are pressure sensors, the first sensors can detect flexural vibration generated through contact by a finger or the like. However, since first sensors are configured to generate flexural vibrations through contact, it is problematic that first sensors have poor real-time pressure detection and cannot detect delicate sliding operations.

In view of this, input device 1 according to the present embodiment is a capacitive input device 1 and includes a plurality of first sensor electrodes 10 and a plurality of second sensor electrodes 20. Furthermore, the plurality of first sensor electrodes 10 and the plurality of second sensor electrodes 20 are electrically disconnected. Additionally, the plurality of first sensor electrodes 10 are disposed in a radial arrangement centered on a reference point. Moreover, the plurality of second sensor electrodes 20 are disposed in a concentric circular arrangement centered on the reference point.

Accordingly, input device 1, being capacitive, has superior real-time detection of touch operations compared to cases where pressure sensors are used.

Furthermore, when a person performs a touch operation on input device 1 using a finger, for example, first sensor electrode 10 among the plurality of first sensor electrodes 10 and second sensor electrode 20 among the plurality of second sensor electrodes 20 detect the touch operation independent of each other. Specifically, since the plurality of first sensor electrodes 10 are disposed in a radial arrangement centered on the reference point, touch locations in a circumferential direction can be detected. Furthermore, since the plurality of second sensor electrodes 20 are disposed in a concentric circular arrangement centered on the reference point, touch locations in a radial direction relative to the reference point can be detected.

Consequently, input device 1 can enhance touch operation detection speed and accurately detect touch locations.

In particular, the touch sensor described in PTL 1 is configured so that the first sensor bends when touched to allow the first sensor to detect both touch locations and pressure. However, in the present embodiment, input device 1 is of the capacitive type, and thus first sensor electrodes 10 and second sensor electrodes 20 do not need to be configured to bend when a person performs a touch operation on input device 1 using a finger.

Furthermore, input device 1 according to the present embodiment includes a board-shaped insulator 30. Additionally, each of the plurality of first sensor electrodes 10 is disposed on one surface 31 of insulator 30. Moreover, each of the plurality of second sensor electrodes 20 is disposed on other surface 32 of insulator 30. Furthermore, other surface 32 is located closer to the operation surface than one surface 31.

Accordingly, since each of the plurality of second sensor electrodes 20 is disposed on other surface 32, and each of the plurality of first sensor electrodes 10 is disposed on one surface 31, by disposing the plurality of second sensor electrodes 20 on the side closer to an operating member, the plurality of first sensor electrodes 10 and the plurality of second sensor electrodes 20 can be used to detect the operating member.

Furthermore, by disposing each of the plurality of first sensor electrodes 10 on one surface 31 of insulator 30, and disposing each of the plurality of second sensor electrodes 20 on other surface 32 of insulator 30, the patterns of first sensor electrodes 10 and second sensor electrodes 20 can easily and simply be formed on insulator 30.

Additionally, in input device 1 according to the present embodiment, each of the plurality of first sensor electrodes 10 is a planar electrode. Moreover, each of the plurality of second sensor electrodes 20 is a wire-shaped electrode.

Accordingly, by disposing the plurality of first sensor electrodes 10 on one surface 31 of insulator 30, and disposing the plurality of second sensor electrodes 20 on other surface 32 of insulator 30, the plurality of first sensor electrodes 10 and the plurality of second sensor electrodes 20 can accurately detect the operating member.

Furthermore, in input device 1 according to the present embodiment, each of the plurality of first sensor electrodes 10 is formed to have a width that increases with distance from the reference point.

Accordingly, since the configuration can be adjusted in this manner to suit operations performed on circular areas, touch locations can be accurately detected even when operations are performed on circular areas.

Furthermore, input device 1 according to the present embodiment includes controller 40 that identifies an input location of the operating member based on changes in capacitance of each of the plurality of first sensor electrodes 10 and each of the plurality of second sensor electrodes 20.

Accordingly, the input location of the operating member can accurately be identified. For this reason, when a user performs an operation in accordance with a design provided on input device 1, controller 40 can output, to an external device, a command which is in accordance with the design and that corresponds to the input location.

(Variation 1 of Embodiment)

Note that input device 1a in the present variation differs with the input device in the above-described embodiment in that first sensor electrodes 10 of input device 1a include electrode portions 11 and connecting portions 12. In the present variation, elements having configurations and functions that are substantially the same with those in the input device in the above-described embodiment are given the same reference signs, and detailed description of such configurations and functions will be omitted as appropriate.

Input device 1a according to the present variation will be described with reference to FIG. 4 and FIG. 5.

Figure 4:
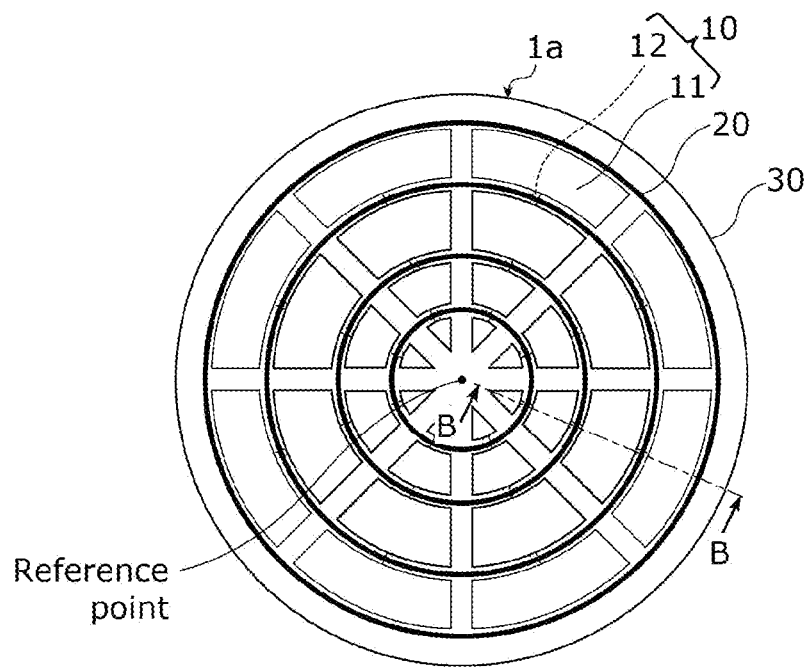
FIG. 4 is a plan view of an input device according to variation 1 of the embodiment.

FIG. 4 is a plan view of input device 1a according to variation 1 of the embodiment. FIG. 5 is a cross-sectional view of input device 1a taken along line B-B in FIG. 4.

Figure 5:
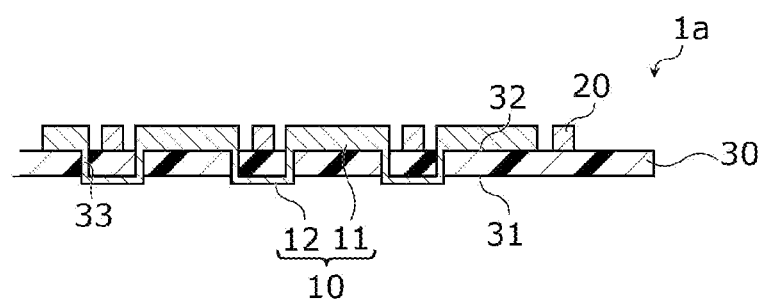
FIG. 5 is a cross-sectional view of the input device taken along line B-B in FIG. 4.

As illustrated in FIG. 4 and FIG. 5, each of the plurality of first sensor electrodes 10 is disposed on one surface 31 and other surface 32 of insulator 30. Each of the plurality of second sensor electrodes 20 is disposed on other surface 32 of insulator 30. Each of the plurality of first sensor electrodes 10 is separated at one or more portions overlapping one or more second sensor electrodes 20 on other surface 32 of insulator 30.

Specifically, each of the plurality of first sensor electrodes 10 includes a plurality of electrode portions 11 and one or more connecting portions 12.

Electrode portions 11 are portions of first sensor electrodes 10 that are separated at one or more portions of first sensor electrodes 10 which overlap one or more second sensor electrodes 20 when first sensor electrodes 10 are seen in plan view. Accordingly, the plurality of electrode portions 11 are disposed in a dispersed manner on other surface 32 of insulator 30.

In a single first sensor electrode 10, one or more connecting portions 12 each electrically connect, from among the plurality of electrode portions 11, two electrode portions 11 that are adjacent to each other in a radial direction extending from the reference point in plan view.

Connecting portion 12 is disposed on a level lower than other surface 32 of insulator 30 to avoid the plurality of second sensor electrodes 20.

Specifically, connecting portion 12 starts from one electrode portion 11 out of two adjacent electrode portions 11, extends toward one surface 31 of insulator 30 via through-hole 33 provided in insulator 30, and reaches one surface 31 of insulator 30. Furthermore, connecting portion 12 extends to a portion of one surface 31 over which the other electrode portion 11 out of the two adjacent electrode portions 11 is disposed, and further extends via another through-hole 33 provided in insulator 30 to establish an electrical connection with the other adjacent electrode portion 11. According to the present variation, connecting portion 12 is disposed inside insulator 30 and on one surface 31 of insulator 30, which are at a level lower than other surface 32 of insulator 30.

In this way, input device 1a according to the present variation includes a board-shaped insulator 30. Furthermore, each of the plurality of first sensor electrodes 10 includes, when seen in plan view, a plurality of electrode portions 11 separated at one or more portions overlapping one or more second sensor electrodes 20, and one or more connecting portions 12 each electrically connecting, from among the plurality of electrode portions 11, two electrode portions 11 that are adjacent to each other in a radial direction extending from the reference point in plan view. Furthermore, each of the plurality of second sensor electrodes 20 is disposed on other surface 32 of insulator 30. Additionally, connecting portion 12 is disposed on a level lower than other surface 32 to avoid the plurality of second sensor electrodes 20.

Accordingly, electrode portions 11 of first sensor electrodes 10 and the plurality of second sensor electrodes 20 can be disposed on other surface 32 of insulator 30. For this reason, since the distance between first sensor electrodes 10 and an operating member, and the distance between second sensor electrodes 20 and the operating member can be made equal, the sensitivity of first sensor electrodes 10 and the sensitivity of second sensor electrodes 20 can be made equal.

(Variation 2 of Embodiment)

Note that input devices 1b and 1c in the present variation differ with the input device in the above-described embodiment in that input devices 1b and 1c include operation panel 50, and second sensor electrodes 20 are disposed in a concentric circular arrangement in which intervals between two adjacent second sensor electrodes 20 become narrower. In the present variation, the same reference signs are used to represent configurations and functions that are equivalent to those of the input device in the above-described embodiment, and detailed descriptions on such configurations and functions will be omitted as needed.

Input devices 1b and 1c according to the present variation will be described with reference to FIG. 6 through FIG. 9.

Figure 6:
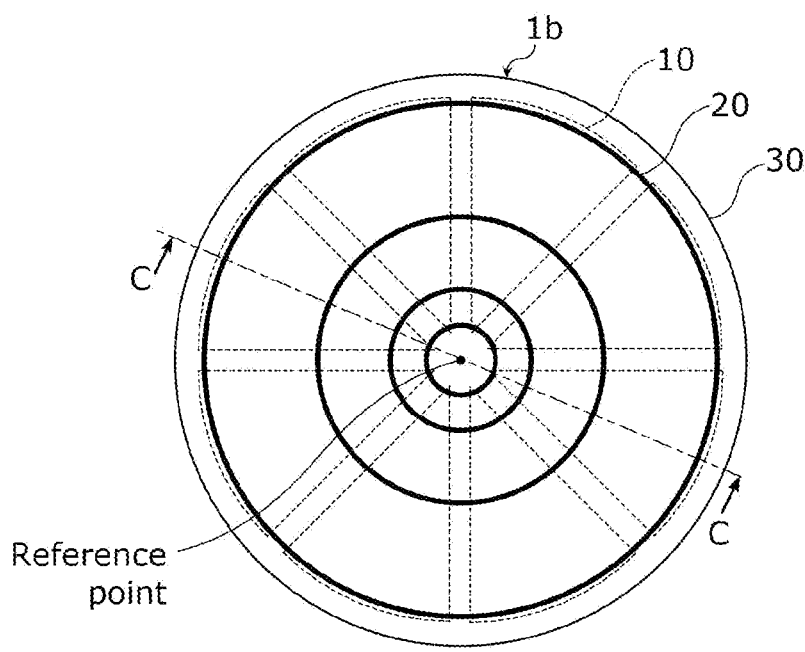
FIG. 6 is a plan view of an input device according to variation 2 of the embodiment.
Figure 7:
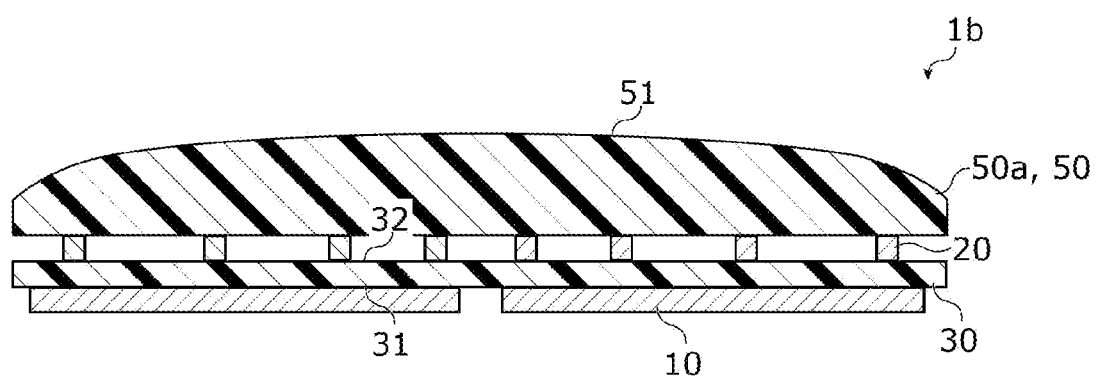
FIG. 7 is a cross-sectional view of the input device taken along line C-C in FIG. 6.
Figure 8:
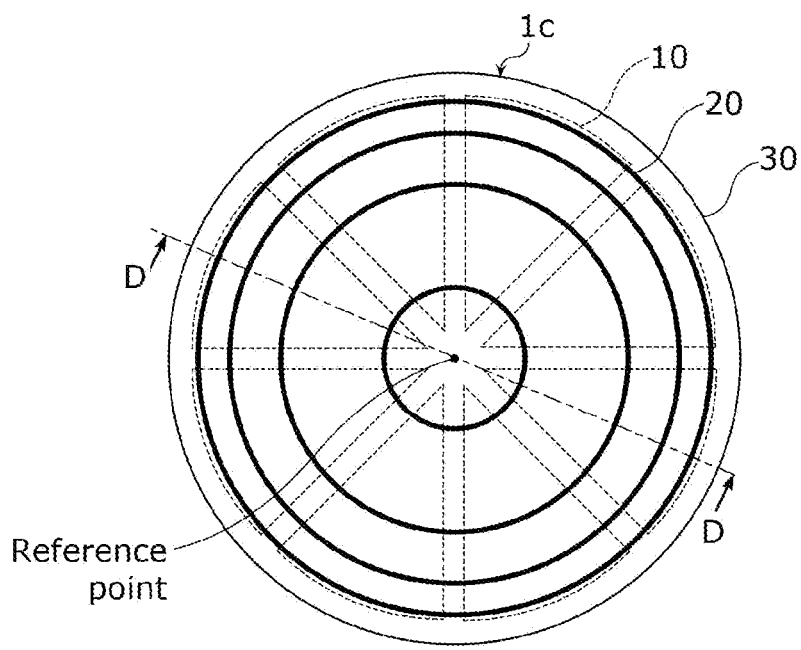
FIG. 8 is a plan view of another input device according to variation 2 of the embodiment.
Figure 9:
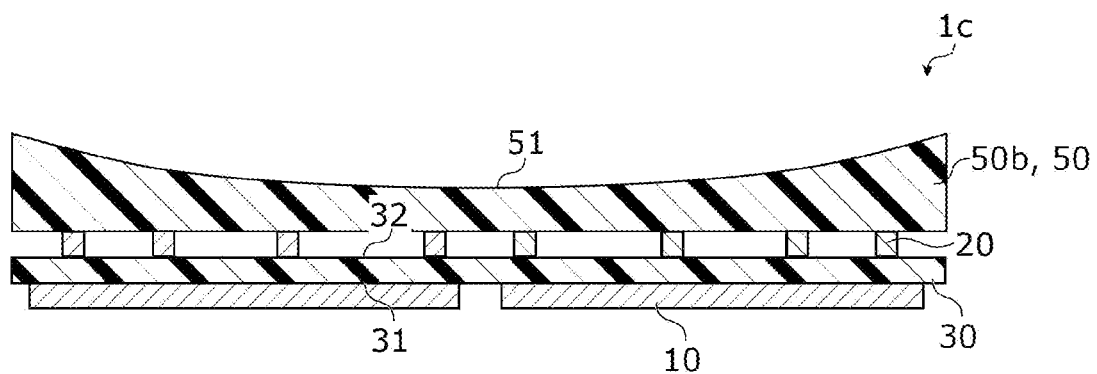
FIG. 9 is a cross-sectional view of the other input device taken along line D-D in FIG. 8.

FIG. 6 is a plan view of input device 1b according to variation 2 of the embodiment. FIG. 7 is a cross-sectional view of input device 1b taken along line C-C in FIG. 6. FIG. 8 is a plan view of another input device 1c according to variation 2 of the embodiment. FIG. 9 is a cross-sectional view of input device 1c taken along line D-D in FIG. 8. In FIG. 6 and FIG. 8, operation panel 50 has been omitted. Furthermore, "operation panel 50" is used to collectively refer to operation panel 50a in FIG. 7 and operation panel 50b in FIG. 9.

As illustrated in FIG. 6 through FIG. 9, in addition to insulator 30, a plurality of first sensor electrodes 10, a plurality of second sensor electrodes 20, and controller 40, input devices 1b and 1c according to the present variation each include operation panel 50.

Operation panel 50 is disposed to cover each of the plurality of first sensor electrodes 10. Since an operating member can directly come into contact with surface 51 of operation panel 50, capacitance is formed between the operating member and each of the plurality of first sensor electrodes 10, and between the operating member and each of the plurality of second sensor electrodes 20. A design may be provided on surface 51 of operation panel 50.

Operation panel 50 has a shape that corresponds with input devices 1b and 1c. In the present variation, operation panel 50 is disc-shaped.

Operation panel 50 includes a sloped surface or curved surface and either increases or decreases in thickness with proximity to the reference point.

For example, as illustrated in FIG. 6 and FIG. 7, surface 51 of operation panel 50a may have a convex shape that is semispherical or parabolic. Specifically, operation panel 50a may include a sloped surface or curved surface and may increase in thickness with proximity to the reference point.

Furthermore, as illustrated in FIG. 8 and FIG. 9, surface 51 of operation panel 50b may have a concave shape that is semispherical or parabolic. Specifically, operation panel 50b may include a sloped surface or curved surface and may decrease in thickness with proximity to the reference point.

As shown in FIG. 6 through FIG. 9, in a cross section cut along a plane that includes the reference point and is approximately orthogonal to the radial arrangement in a plan view of input device 1b or 1c, the plurality of second sensor electrodes 20 are disposed in a concentric circular arrangement in which the interval between two adjacent second sensor electrodes 20 among the plurality of second sensor electrodes 20 decreases with an increase in the distance between surface 51 of operation panel 50 and second sensor electrode 20. It should be noted that the "distance between surface 51 of operation panel 50 and second sensor electrodes 20" means, for example, the distance from second sensor electrode 20 to the portion of surface 51 located directly above second sensor electrode 20.

For example, as illustrated in FIG. 6 and FIG. 7, when operation panel 50a includes a sloped surface or a curved surface and has a thickness that increases with proximity to the reference point, the plurality of second sensor electrodes 20 are disposed in a concentric circular arrangement in which the interval between two adjacent second sensor electrodes 20 decreases with proximity to the reference point. For this reason, the density per unit area of second sensor electrodes 20 disposed on other surface 32 of insulator 30 increases with proximity to the reference point.

Furthermore, as illustrated in FIG. 8 and FIG. 9, when operation panel 50b includes a sloped surface or a curved surface and has a thickness that decreases with proximity to the reference point, the plurality of second sensor electrodes 20 are disposed in a concentric circular arrangement in which the interval between two adjacent second sensor electrodes 20 decreases with distance from the reference point. For this reason, the density per unit area of second sensor electrodes 20 disposed on other surface 32 of insulator 30 increases with distance from the reference point.

Specifically, as illustrated in FIG. 6 through FIG. 9, two adjacent second sensor electrodes 20 at a location corresponding to a thick portion of operation panel 50 are disposed at narrower intervals compared to other locations. Accordingly, an operating member that comes into contact with a thick portion can be accurately detected.

In this way, input devices 1b and 1c according to the present variation include operation panel 50 that is disposed to cover each of the plurality of first sensor electrodes 10. Furthermore, operation panel 50 either increases in thickness or decreases in thickness with proximity to the reference point. Furthermore, surface 51 of operation panel 50 is a sloped surface or a curved surface. Moreover, in a cross section cut along a plane that includes the reference point and is orthogonal to the radial arrangement in a plan view of input device 1b or 1c, the plurality of second sensor electrodes 20 are disposed in a concentric circular arrangement in which the interval between two adjacent second sensor electrodes 20 among the plurality of second sensor electrodes 20 decreases with an increase in the distance between surface 51 of operation panel 50 and second sensor electrode 20.

In a thick portion of the operation panel, the distance between the second sensor electrode and the operating member is greater than in a thin portion of the operation panel, and thus capacitance between the second sensor electrode and the operating member is lower.

However, in the present variation, since the plurality of second sensor electrodes 20 can be disposed in a concentric circular arrangement in which the interval between two adjacent second sensor electrodes 20 becomes narrower to thereby ensure adequate capacitance between second sensor electrodes 20 and the operating member, sensitivity in the thick portions of operation panel 50 can be enhanced. Accordingly, touch detection accuracy can be ensured even if the operating member comes into contact with a thick portion of operation panel 50.

(Variation 3 of Embodiment)

Note that input device 1d in the present variation differs with the input device in the above-described embodiment in that each of the plurality of second sensor electrodes 20 of input device 1d in the present variation includes ring-shaped portions 21 and projecting portions 22. In the present variation, the same reference signs are used to represent configurations and functions that are equivalent to those of the input device in the above-described embodiment, and detailed descriptions on such configurations and functions will be omitted as needed.

Input device 1d according to the present variation will be described with reference to FIG. 10.

Figure 10:
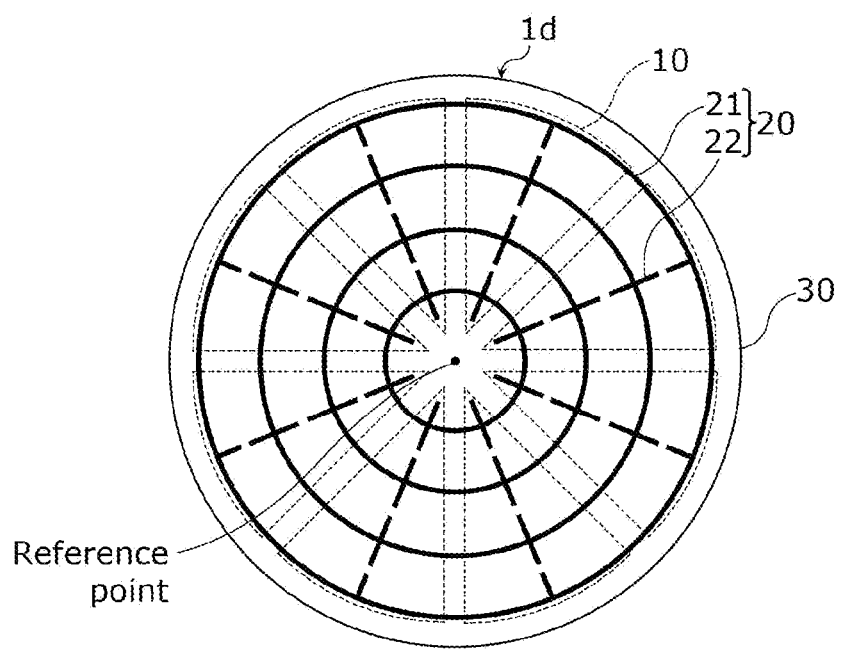
FIG. 10 is a plan view of an input device according to variation 3 of the embodiment.

FIG. 10 is a plan view that illustrates input device 1d according to variation 3 of the embodiment.

As illustrated in FIG. 10, each of the plurality of first sensor electrodes 10 is disposed on one surface 31 of insulator 30. Each of the plurality of second sensor electrodes 20 is disposed on other surface 32 of insulator 30.

The plurality of ring-shaped portions 21 are ring-shaped electrodes that are disposed in a concentric circular arrangement centered on the reference point.

Projecting portions 22 project from ring-shaped portions 21 in the radial direction. In the present variation, although each of the projecting portions 22 are disposed on the inner circumferential side and the outer circumferential side of ring-shaped portions 21 so as to be orthogonal to ring-shaped portions 21, projecting portions 22 may be disposed on only the inner circumferential side or the outer circumferential side of ring-shaped portions 21. Projecting portions 22 are disposed on other surface 32 of insulator 30 to overlap first sensor electrodes 10. It should be noted that the placement locations of projecting portions 22 are not limited to those described in the present variation, and projecting portions 22 may be disposed on other surface 32 of insulator 30 to not overlap first sensor electrodes 10. In the present variation, a plurality of projecting portions 22 are disposed on a single second sensor electrode 20, and the plurality of projecting portions 22 are in a one-to-one relationship with the plurality of first sensor electrodes 10.

In this way, in input device 1d according to the present variation, each of the plurality of second sensor electrodes 20 includes ring-shaped portion 21 disposed in a concentric circular arrangement centered on the reference point, and projecting portions 22 that project from ring-shaped portion 21 in the radial direction.

Accordingly, since the capacitance between the operating member and second sensor electrodes 20 can be increased because the area of second sensor electrodes 20 relative to the operating member increases in proportion to the amount of projecting portions 22 provided, the sensitivity of second sensor electrodes 20 can be enhanced.

(Other Variations)

While the input devices according to the present disclosure have been described based on the above-described embodiments, the present disclosure is not limited to these embodiments. The present disclosure may include forms obtained by various modifications to the foregoing embodiments that can be conceived by those skilled in the art, for as long as they do not depart from the essence of the present disclosure.

For example, in an input device according to the above-described embodiments, the projected area of the entirety of the plurality of first sensor electrodes may be equal to the projected area of the entirety of the plurality of second sensor electrodes. In such a case, sensitivity of the plurality of first sensor electrodes and sensitivity of the plurality of second sensor electrodes can be made equal.

Figure 11:
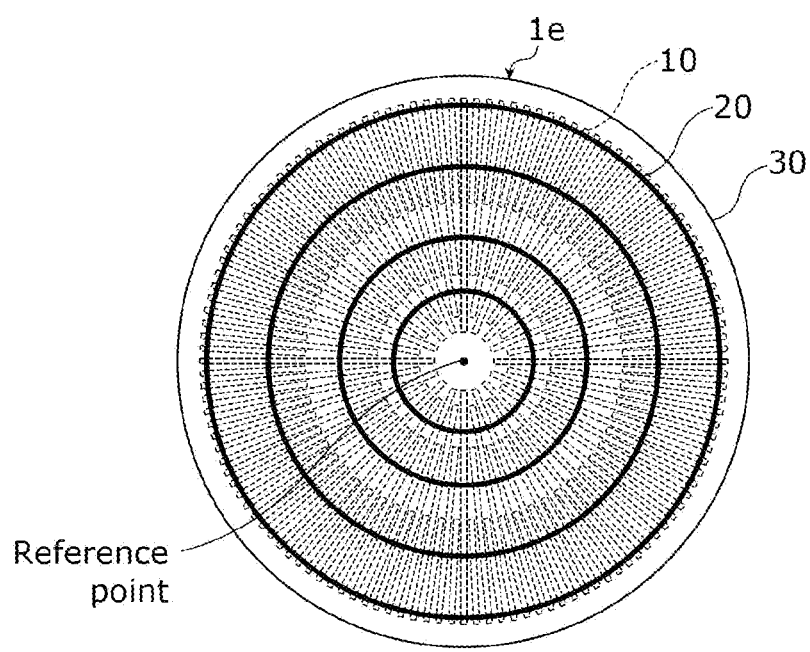
FIG. 11 is a plan view of an input device according to another variation of the embodiment.

Input device 1e according to another variation of the above-described embodiment, will be described with reference to FIG. 11. FIG. 11 is a plan view of input device 1e according to another variation of the embodiment. As illustrated in FIG. 11, first sensor electrodes 10 may have a rectangular shape or belt-like shape. Additionally, the plurality of first sensor electrodes 10 may be disposed in a radial arrangement centered on the reference point.

It should be noted that the present disclosure includes forms obtained by making various modifications to the above-described embodiments that can be conceived by those skilled in the art, as well as forms realized by arbitrarily combining elements and functions in different embodiments without materially departing from the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in its entirety: Japanese Patent Application No. 2022-053103 filed on Mar. 29, 2022.

INDUSTRIAL APPLICABILITY

The input device according to the present disclosure is applicable to, for example, vehicles, and in particular, vehicle steering wheels, and the like.

The invention claimed is:

1. An input device that is capacitive, the input device comprising:
   a plurality of first sensor electrodes;
   a plurality of second sensor electrodes; and
   an insulator that is board-shaped, wherein:
      the plurality of first sensor electrodes and the plurality of second sensor electrodes are electrically disconnected,
      the plurality of first sensor electrodes are disposed in a radial arrangement centered on a reference point,
      the plurality of second sensor electrodes are disposed in a concentric circular arrangement centered on the reference point,
      each of the plurality of first sensor electrodes includes:
         a plurality of electrode portions separated at one or more portions of the first sensor electrode overlapping one or more of the plurality of second sensor electrodes, in a plan view of the input device; and
         one or more connecting portions each electrically connecting two electrode portions that are adjacent to each other in a radial direction extending from the reference point in the plan view, the two electrode portions being included in the plurality of electrode portions, and
      each of the plurality of second sensor electrodes is disposed on an other surface of the insulator, and
      the connecting portion is disposed below the other surface to avoid the plurality of second sensor electrodes.

2. The input device according to claim 1, wherein:
   each of the plurality of first sensor electrodes is disposed on one surface of the insulator,
   each of the plurality of second sensor electrodes is disposed on an other surface of the insulator, and
   the other surface is located closer to an operation surface than the one surface.

3. The input device according to claim 2, wherein
   each of the plurality of first sensor electrodes is a planar electrode, and
   each of the plurality of second sensor electrodes is a wire-shaped electrode.

4. The input device according to claim 3, wherein
   each of the plurality of first sensor electrodes has a width that increases with distance from the reference point.

5. The input device according to claim 4, further comprising:
   an operation panel disposed to cover each of the plurality of first sensor electrodes, wherein
      the operation panel increases in thickness or decreases in thickness with proximity to the reference point,
      a surface of the operation panel is a sloped surface or a curved surface, and
      in a cross section cut along a plane that includes the reference point and is orthogonal to the radial arrangement in a plan view of the input device, the plurality of second sensor electrodes are disposed in the concentric circular arrangement in which an interval between two adjacent second sensor electrodes among the plurality of second sensor electrodes decreases with an increase in distance between the surface of the operation panel and the two adjacent second sensor electrodes.

6. The input device according to claim 1, wherein
   each of the plurality of first sensor electrodes is formed to have a width that increases with distance from the reference point.

7. The input device according to claim 6, further comprising:
   an operation panel disposed to cover each of the plurality of first sensor electrodes, wherein
      the operation panel increases in thickness or decreases in thickness with proximity to the reference point,
      a surface of the operation panel is a sloped surface or a curved surface, and
      in a cross section cut along a plane that includes the reference point and is orthogonal to the radial arrangement in a plan view of the input device, the plurality of second sensor electrodes are disposed in the concentric circular arrangement in which an interval between two adjacent second sensor electrodes among the plurality of second sensor electrodes decreases with an increase in distance between the surface of the operation panel and the two adjacent second sensor electrodes.

8. The input device according to claim 1, further comprising:
   an operation panel disposed to cover each of the plurality of first sensor electrodes, wherein
      the operation panel increases in thickness or decreases in thickness with proximity to the reference point,
      a surface of the operation panel is a sloped surface or a curved surface, and
      in a cross section cut along a plane that includes the reference point and is orthogonal to the radial arrangement in a plan view of the input device, the plurality of second sensor electrodes are disposed in the concentric circular arrangement in which an interval between two adjacent second sensor electrodes among the plurality of second sensor electrodes decreases with an increase in distance between the surface of the operation panel and the two adjacent second sensor electrodes.

9. The input device according to claim 8, wherein
   each of the plurality of second sensor electrodes includes:
      a ring-shaped portion disposed in the concentric circular arrangement centered on the reference point; and
      a plurality of projecting portions projecting from the ring-shaped portion in a radial direction extending from the reference point.

10. The input device according to claim 1, wherein
   each of the plurality of second sensor electrodes includes:

a ring-shaped portion disposed in the concentric circular arrangement centered on the reference point; and a plurality of projecting portions projecting from the ring-shaped portion in a radial direction extending from the reference point.

11. The input device according to claim 1, further comprising:

a controller that identifies an input location of an operating member based on a change in capacitance of each of the plurality of first sensor electrodes and a change in capacitance of each of the plurality of second sensor electrodes.

12. An input device that is capacitive, the input device comprising:

a plurality of first sensor electrodes;

a plurality of second sensor electrodes; and an operation panel disposed to cover each of the plurality of first sensor electrodes, wherein:

the plurality of first sensor electrodes and the plurality of second sensor electrodes are electrically disconnected, the plurality of first sensor electrodes are disposed in a radial arrangement centered on a reference point, the plurality of second sensor electrodes are disposed in a concentric circular arrangement centered on the reference point, the operation panel increases in thickness or decreases in thickness with proximity to the reference point, a surface of the operation panel is a sloped surface or a curved surface, and in a cross section cut along a plane that includes the reference point and is orthogonal to the radial arrangement in a plan view of the input device, the plurality of second sensor electrodes are disposed in the concentric circular arrangement in which an interval between two adjacent second sensor electrodes among the plurality of second sensor electrodes decreases with an increase in distance between the surface of the operation panel and the two adjacent second sensor electrodes.

* * * * *